(12) United States Patent
Wang

(10) Patent No.: US 8,439,233 B2
(45) Date of Patent: May 14, 2013

(54) SPRAY HEAD ASSEMBLY

(75) Inventor: Ya-Tsan Wang, Shanghai (CN)

(73) Assignee: Derxin (Shanghai) Cosmetics Co., Ltd., Shanghai (CN)

( * ) Notice: Subject to any disclaimer, the term of this patent is extended or adjusted under 35 U.S.C. 154(b) by 271 days.

(21) Appl. No.: 12/923,679

(22) Filed: Oct. 4, 2010

(65) Prior Publication Data

US 2012/0080454 A1    Apr. 5, 2012

(51) Int. Cl.
*B65D 88/54* (2006.01)
*G01F 11/00* (2006.01)

(52) U.S. Cl.
USPC ........................................... 222/321.2

(58) Field of Classification Search ............... 222/321.2, 222/319, 320, 321.1, 321.3, 321.5, 321.7, 222/321.8
See application file for complete search history.

(56) References Cited

U.S. PATENT DOCUMENTS

| | | | |
|---|---|---|---|
| 5,560,520 A * | 10/1996 | Grogen | 222/321.2 |
| 6,202,896 B1 * | 3/2001 | Bonningue | 222/321.1 |
| 6,962,273 B2 * | 11/2005 | Masuda | 222/321.9 |
| 7,066,359 B2 * | 6/2006 | Greiner-Perth | 222/321.2 |
| 7,243,820 B2 * | 7/2007 | Dumont | 222/321.4 |
| 2004/0069811 A1 * | 4/2004 | Perignon et al. | 222/321.7 |

* cited by examiner

*Primary Examiner* — Kevin P Shaver
*Assistant Examiner* — Michael Melaragno

(57) ABSTRACT

A spray head assembly includes a head, a main tube, a link, a piston, a reception member, a mount piece and a spring. The parts made of metal such as the spring is isolated from the liquid to ensure that the liquid is not affected by the metal. The main tube can be stopped by the extension portion of the mount piece so as to adjust the length of the mount piece to control the travel distance of the main tube so as to control the volume of each spray.

6 Claims, 5 Drawing Sheets

SPRAY HEAD ASSEMBLY

BACKGROUND OF THE INVENTION (1) Field of the Invention

The present invention relates to a spray head assembly, and more particularly, to a spray head assembly which prevents the liquid from being in contact with metal parts.

(2) Description of the Prior Art

A conventional spray head assembly 100 is shown in FIG. 5 and generally includes a head 101 with a nozzle 101a and a mounting part 102 is connected to the head 101. The mounting part 102 is connected to a suction tube 103 which has a cone-shaped member 104 connected thereto. A mount tube 105 is connected to the cone-shaped member 104 and has two holes 105a which are covered by the cone-shaped member 104. A spring 106 is connected to the mount tube 105 and a bead 107 is biased by the spring 106. A reception tube 108 accommodates the suction tube 103, the cone-shaped member 104, the mount tube 105, the spring 106 and the bead 107 therein, and a hose 109 is connected to the reception tube 108.

When using the assembly, the head 101 is pushed to force the air in the bottle to escape from the nozzle 101 so that a low pressure is formed in the head 101 to suck the liquid in the bottle via the hose 109 into the reception tube 108. The mount tube 105 is applied byte force of the spring 106 to push the bead 107 to seal the opening of the reception tube 108 and gap is defined between the mount tube 105 and the cone-shaped member 104. Therefore, the liquid in the reception tube 108 flows into the mount tube 105 via the holes 105a. The liquid is then sucked by the suction tube 103 and ejected from the nozzle 101a of the head 101. When releasing the head 101, the liquid in the reception tube 108 flows back into the bottle.

However, the spring 106 is located between the cone-shaped member and the reception tube 108 so that the spring 106 which is made by metal is in contact with the liquid in the reception tube 108 and the liquid may have chemical action with the metal or may be contaminated by the metal material, and which is harmful to the users.

The present invention intends to provide a spray head assembly that improves all of the shortcomings of the conventional spray head assembly.

SUMMARY OF THE INVENTION

The present invention relates to a spray head assembly and comprises a head having a nozzle connected thereto and an extension tube is connected to the head. A main tube has a mount tube on a first end thereof and the mount tube is inserted into the extension tube. A tubular portion is formed on a second end of the main tube and a flange extends from an outer periphery of the main tube and is located between the mount tube and the tubular portion. A link is a hollow tube and has an elongate part on a first end thereof and the elongate part extends through the main tube. Multiple grooves are defined axially in an outer surface of the link and an annular seal end is formed on a second end of the link. A piston is movably mounted to the link and has a first opening and a second opening defined in two ends thereof. The piston is reciprocally moved to contact the seal end or to be separated from the seal end. A reception member is mounted to the piston and has a first section and a second section, wherein a diameter of the first section is larger than that of the second section. A shoulder is formed on an outer surface of the reception member and located between the first and second sections. An inlet is defined in the second section and a chamber is defined between the inlet and the piston. A one-way valve is located at the inlet. A mount piece is connected to the reception member and has a through hole through which the main tube extends. An extension portion extends from the mount piece and the main tube is stopped when the extension portion contacts the flange of the main tube. A spring is mounted to the main tube and biased between the flange and the shoulder of the reception member so as to provide a force to the main tube. A positioning member connects the spray head assembly to a bottle.

A primary object of the present invention is to provide a spray head assembly wherein the metal part such as the spring is allocated to not be in contact with the liquid so that the liquid in the bottle is ensured not to be contaminated.

Another object of the present invention is to provide a spray head assembly wherein the length of the mount piece is adjusted to control the travel distance of the main tube so as to control the volume of each spray.

DETAILED DESCRIPTION OF THE PREFERRED EMBODIMENT

Figure 1:
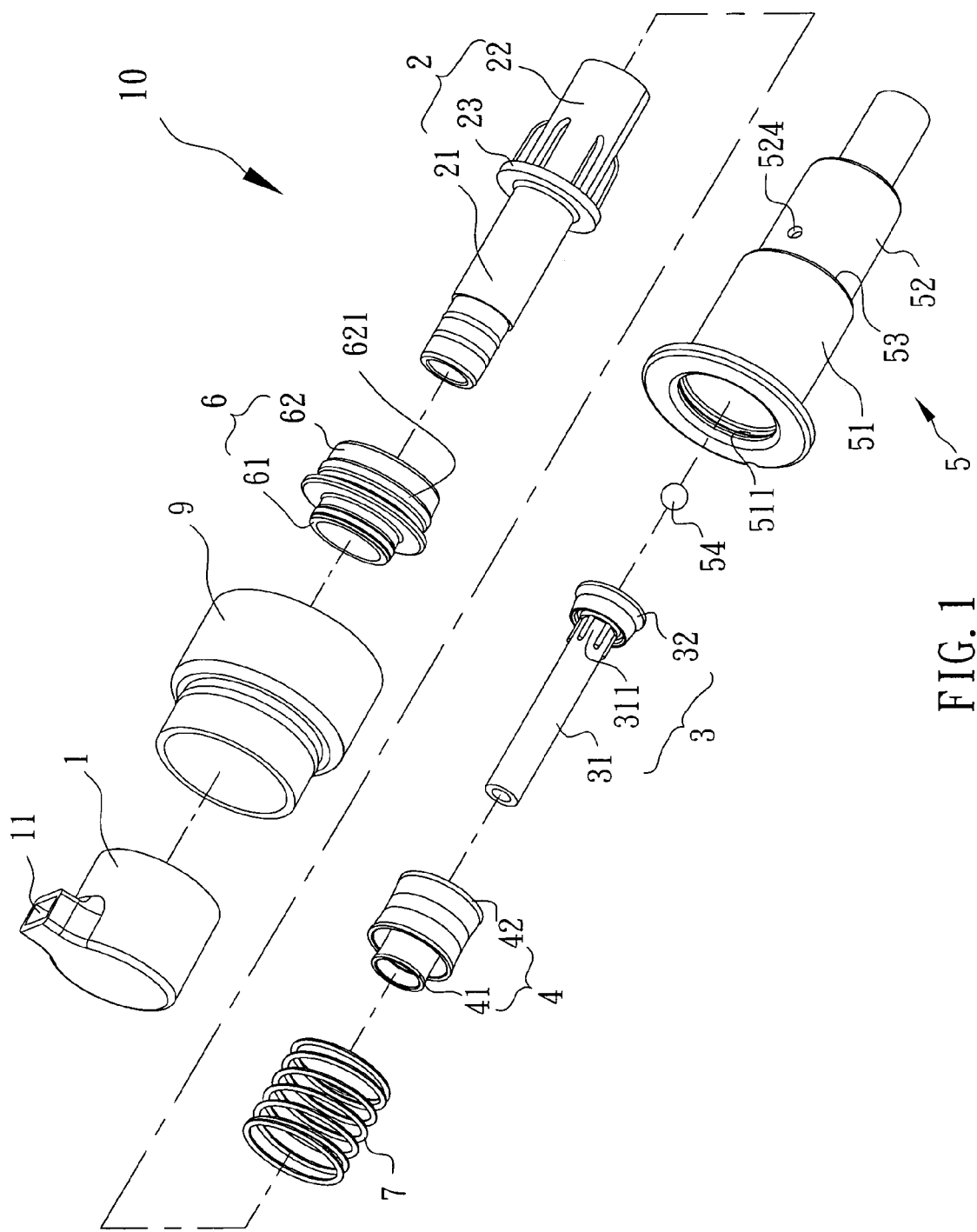
FIG. 1 is an exploded view to show the spray head assembly of the present invention.
Figure 2:
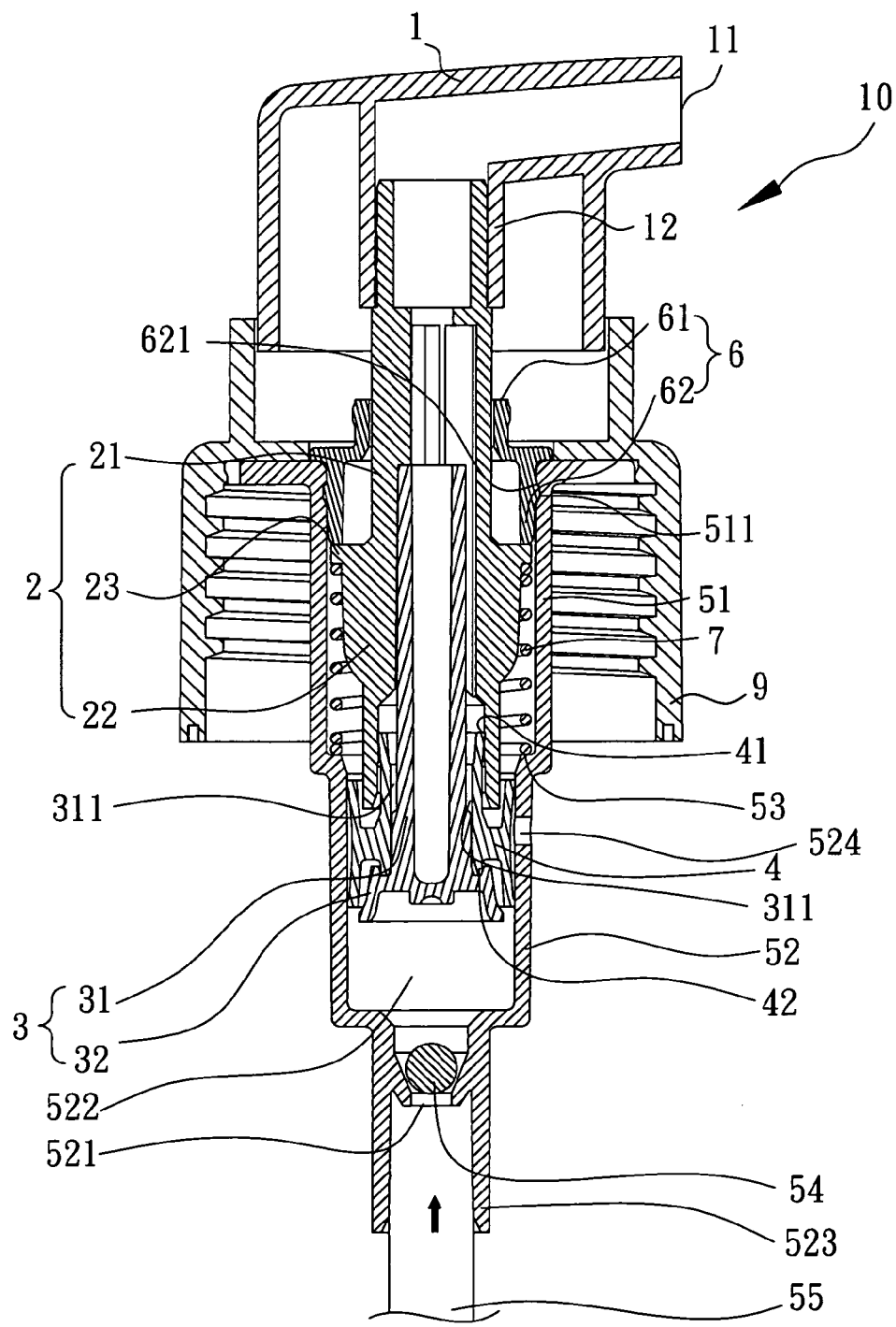
FIG. 2 is a cross sectional view of the spray head assembly of the present invention.

Referring to FIGS. 1 and 2, the spray head assembly 10 of the present invention is designed to suck liquid in a bottle and eject the liquid from the spray head assembly 10. The spray head assembly 10 comprises a head 1 having a nozzle 11 connected thereto and an extension tube 12 is connected to the head 1. A main tube 2 has a mount tube 21 on a first end thereof and the mount tube 21 is inserted into the extension tube 12. A tubular portion 22 formed on a second end of the main tube 2 and a flange 23 extends from an outer periphery of the main tube 2 and is located between the mount tube 21 and the tubular portion 22. A link 3 is a hollow tube and has an elongate part 31 on a first end thereof and the elongate part 31 extends through the main tube 2. Multiple grooves 311 are defined axially in an outer surface of the link 3 and an annular seal end 32 is formed on a second end of the link 3. A piston 4 is movably mounted to the link 3 and has a first opening 41 and a second opening 42 defined in two ends thereof. The piston 4 is reciprocally moved to contact the seal end 32 or to be separated from the seal end 32. A reception member 5 is mounted to the piston 4 and includes a first section 51 and a second section 52. A diameter of the first section 51 is larger than that of the second section, and a shoulder 53 is formed on an outer surface of the reception member 5 and located between the first and second sections 51, 52. An inlet 521 is defined in the second section 52 and a chamber 522 is defined between the inlet 521 and the piston 4. A one-way valve 54 is located at the inlet 521. In this embodiment, the one-way valve 54 is a bead. The second section 52 of the reception member 5 has a reception port 523 defined therein. The reception port 523 is connected with a suction tube 55 which is inserted into the bottle 20. A mount piece 6 is connected to the reception member 5 and has a through hole 61 through which the main tube 2 extends. An extension portion 62 extends from the mount piece 6 and the main tube 2 is stopped when the extension portion 62 contacts the flange 23 of the main tube 2. A spring 7 is mounted to the main tube 2 and biased between the flange 23 and the shoulder 53 of the reception member 5 so as to provide a force to the main tube 2. A positioning member 9 is used to connect the spray head assembly 10 to a bottle 20.

The piston 4 is movably mounted to the link 3 and the two parts are connected to each other to be a closed status or to be separated from each other to form an opened status. A gap 8 is defined between the second section 52 of the reception member 5 and the seal end 32 when in the opened status. Liquid in the bottle 20 flows into the head 1 via the gap 8 and the grooves 311 and is ejected from the nozzle 11 by pressing the head 1.

A side hole 524 is defined through a wall of the second section 52 of the reception member 5 and communicates with outside so as to balance pressure in the reception member 5 after the head 1 is pressed. When the piston 4 moves the a lower portion of the reception member 5, the interior of the reception member 5 and outside of the reception member 5 are in communication with each other so that the pressure in the reception member 5 and the pressure outside of the reception member 5 is balanced. An engaging portion 511 is located in the first section 51 of the reception member 5 and the mount piece 6 has a connection portion 621 on an outside of the extension portion 62 so as to be engaged with the engaging portion 511 to connect the reception member 5 and the mount piece 6.

Figure 3:
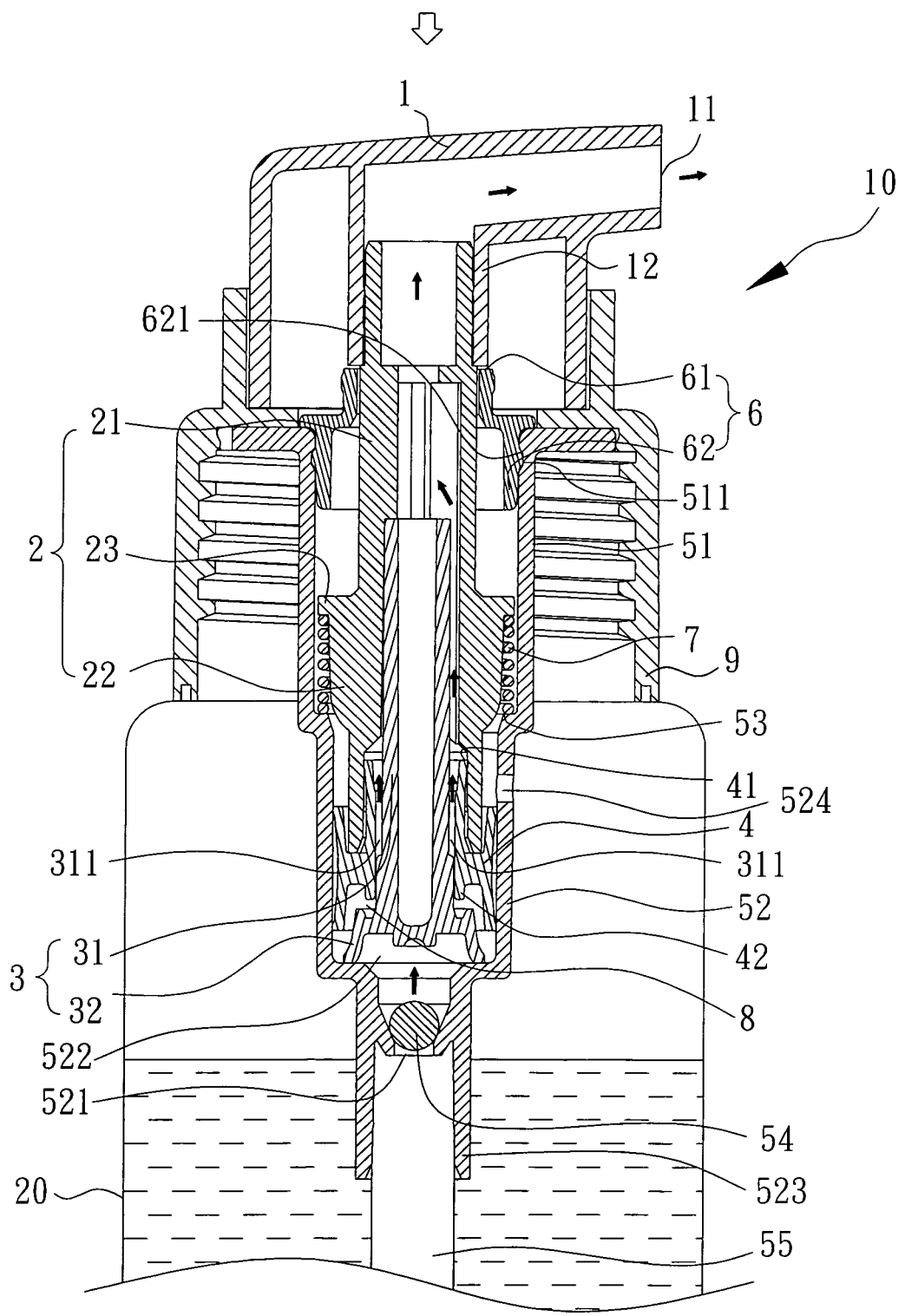
FIG. 3 is a cross sectional view to show one of the operated status of the spray head assembly of the present invention.

As shown in FIG. 3, when the head 1 is pressed, the main tube 2 is lowered and the link 3 and the piston are lowered in sequence. In the meanwhile, the piston 4 gradually reduces the volume of the chamber 522 of the reception member 5 so that the hydraulic pressure increases to move the one-way valve 54 to seal the inlet 521 of the reception member 5 to seal the chamber 522. The second opening 42 of the piston 4 is then opened to form the gap 8. The liquid is ejected from the nozzle 11 by the high pressure via the grooves 311 and the main tube 2.

Figure 4:
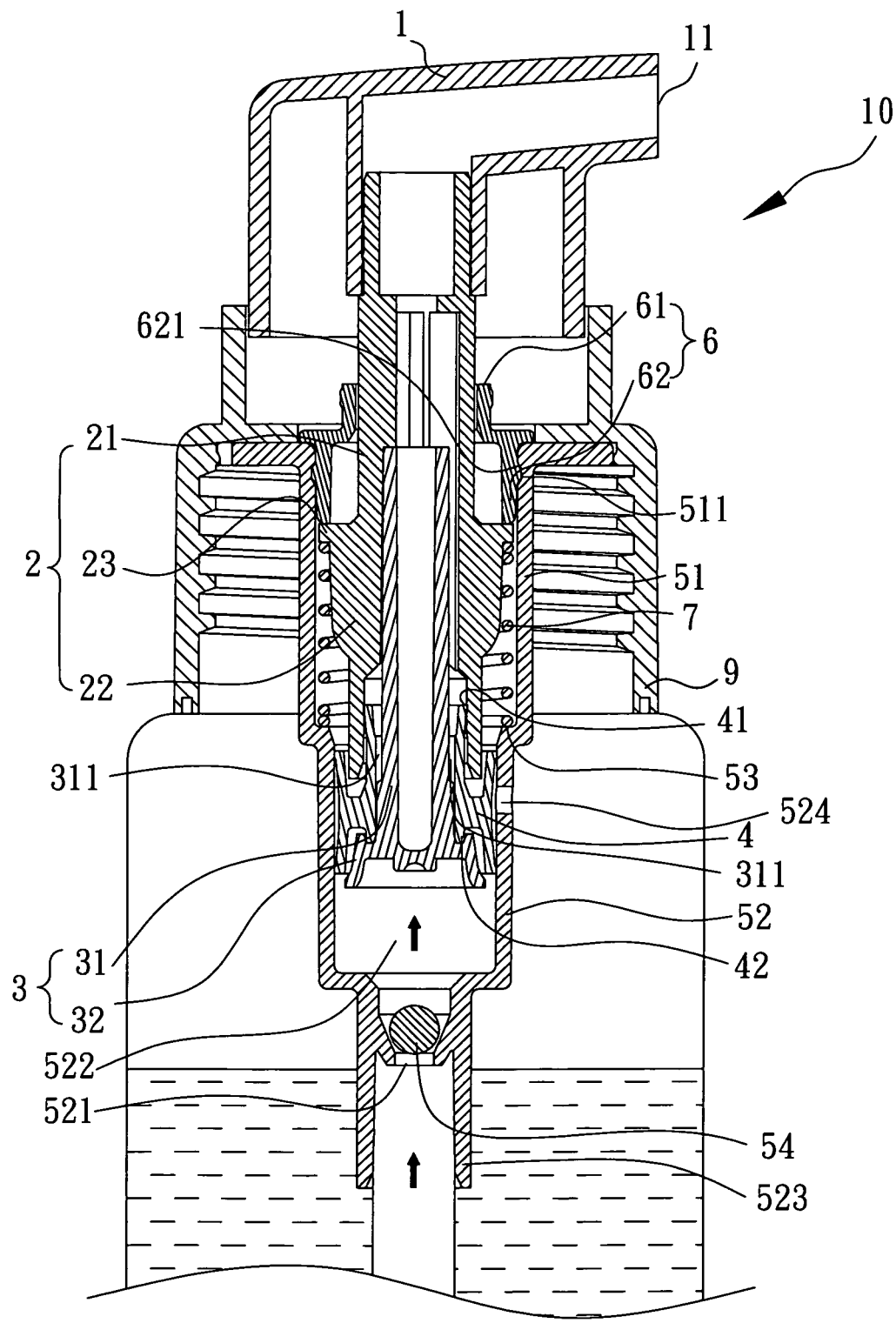
FIG. 4 is a cross sectional view to show another one of the operated status of the foam spray head assembly of the present invention.
Figure 5:
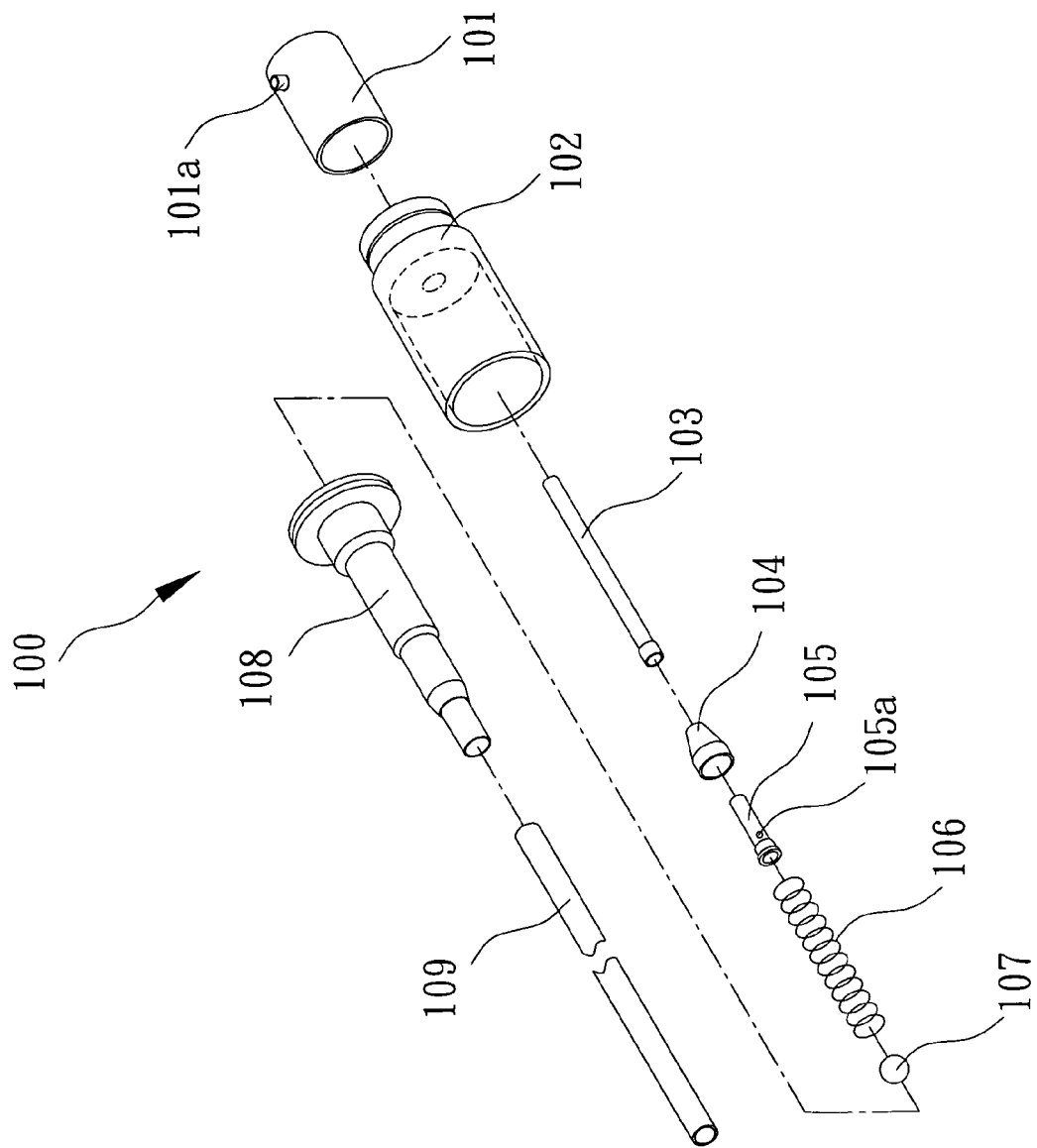
FIG. 5 is an exploded view to show a conventional spray head assembly.

As shown in FIG. 4, when the head 1 is released, the main tube 2 and the head 1 move back by the force of the spring 7, and the link 3 is moved upward so as to seal the gap 8 between the seal end 32 and the second opening 42. The spring 7 continuously pushes upward to move the piston 4 upward to increase the volume of the chamber 522 and a low pressure is formed in the chamber 522. The low pressure makes the inlet 521 and the liquid in the bottle 20 suddenly moves upward and flows into the chamber 522 via the suction tube 55 and the inlet 521, and ready for the next ejection.

It is noted that when the main tube 2 moves back, the extension portion 62 of the mount piece 6 contacts the flange 23 of the main tube 2. Accordingly, by control the length of the extension portion 62 of the mount piece 6, the travel distance of the main tube 2 can be adjusted to control the volume of each spray.

While we have shown and described the embodiment in accordance with the present invention, it should be clear to those skilled in the art that further embodiments may be made without departing from the scope of the present invention.

What is claimed is:

1. A spray head assembly comprising:
a head having a nozzle and an extension tube connected thereto;
a main tube having a mount tube inserted into the extension tube, a tubular portion integratedly axially extending from the main tube, and a flange outward formed between the mount tube and the tubular portion;
a link, being a hollow tube, and having an elongated part extending through the main tube, multiple grooves axially formed on the elongated part, and an annular seal end;
a piston, movably mounted to the link and having a first opening and a second opening defined in two ends thereof, and the piston reciprocally moved to contact the seal end or to be separated from the seal end;
a reception member, mounted to the piston, and having a first section a, a second section and a reception port, wherein a diameter of the first section is larger than that of the second section, a shoulder is formed between the first and second sections, the reception port axially extends from the second section, an inlet is formed in the reception port, a chamber is defined between the inlet and the piston, an annular gap is defined between the second section and the seal end when the piston is moved and separated from the seal end of the link, the annular gap communicating with the grooves of the link, the chamber completely communicates with the inlet without any intermediate, and a one-way valve located in the inlet;
a mount piece, connected to the reception member and having a through hole through which the main tube extends, and an extension portion extending from the mount piece and the main tube being stopped when the extension portion contacts the flange of the main tube; and
a spring, axially received in the main tube and clamped between the flange of the main tube and the shoulder of the reception member so as to provide a force to the main tube.

2. The assembly as claimed in claim 1, wherein an engaging portion is located in the first section of the reception member and the mount piece has a connection portion on an outside of the extension portion so as to be engaged with the engaging portion to connect the reception member and the mount piece.

3. The assembly as claimed in claim 1, wherein the reception port is connected with a suction tube.

4. The assembly as claimed in claim 1, wherein a side hole is defined through a wall of the second section of the reception member and communicates with outside so as to balance pressure in the reception member after the head is pressed.

5. The assembly as claimed in claim 1, wherein a bottom end of the tubular portion of the main tube is located in the first opening of the piston.

6. The assembly as claimed in claim 1, wherein the annular seal end is received in the second opening of the piston.

* * * * *